United States Patent Office 3,405,083
Patented Oct. 8, 1968

3,405,083
HEAT-SEALABLE FILMS COMPRISING A POLYOLEFIN COATED WITH AN ETHYLENE - ETHYL ACRYLATE COPOLYMER AND SURFACTANTS
Edward D. Morrison and Billy R. Dotson, Rochester, N.Y., assignors to Eastman Kodak Company, Rochester, N.Y., a corporation of New Jersey
No Drawing. Filed Mar. 5, 1964, Ser. No. 349,749
5 Claims. (Cl. 260—23)

This invention relates to heat-sealable polyolefin film. More particularly, this invention relates to a unitary member that is heat-sealable to itself and to other members, and which is comprised of a polyolefin film and a coating comprised of an ethylene-ethyl acrylate copolymer on at least one surface thereof, the unitary member being adapted particularly for use as a heat-sealable wrapping and packaging material.

Films of a thickness of the order of from about 0.5 mil to 10 mils prepared from polyolefin resins such as polyethylene and polypropylene have utility as packaging materials. The heat sealing properties of polyolefin films have not proved to be entirely satisfactory owing to the fact that relatively high temperatures are required to effect a satisfactory seal. The relatively high temperatures required to effect a heat seal tend to cause distortion and wrinkling of the film.

An object of this invention is a heat-sealable polyolefin film.

Another object of this invention is a heat-sealable polyethylene film.

A further object of this invention is a unitary member comprised of a polyethylene film and a relatively thin coating comprised of an ethylene-ethyl acrylate copolymer on at least one surface thereof.

A still further object of this invention is a unitary member comprised of a polypropylene film and a relatively thin coating comprised of an ethylene-ethyl acrylate copolymer on at least one surface thereof.

Broadly, in accordance with this invention, there is provided a heat-sealable polyolefin film adapted particularly for use as a packaging and wrapping material for food products, tobacco products, confectionery products, and the like.

More particularly, in accordance with this invention, there is provided a unitary member comprised of a polyolefin film, such as polyethylene film, and a relatively thin adherent coating comprised of an ethylene-ethyl acrylate copolymer on at least one surface thereof. The applied coating comprised of an ethylene-ethyl acrylate copolymer provides a coated polyolefin film having highly satisfactory heat sealing characteristics.

Polyolefin films employed in this invention can be those prepared from poly-α-olefins derived from α-olefins having from 2–10 carbon atoms. Specific examples of suitable polyolefin films are those prepared from polyethylene, polypropylene, and poly-1-butene.

Polyethylene films that can be used in this invention are those prepared from what are referred to in the art as low density polyethylene, medium density polyethylene, and high density polyethylene. Low density polyethylene has a density from about 0.91 to 0.929, medium density polyethylene has a density of from about 0.93 to 0.945, and high density polyethylene has a density of from about 0.946 to 0.97. Films of high density polyethylene are preferred owing to their high strength properties.

The thickness of the polyolefin film used in this invention can be varied over a relatively wide range. The thickness will usually be that employed in packaging applications and will usually be of the order of from about 0.5 mil to 10 mils.

The coating applied to a polyolefin film or substrate in accordance with this invention is comprised of a normally solid copolymer of ethylene and ethyl acrylate containing at least about 2 percent by weight combined ethyl acrylate and preferably not in excess of about 25 percent by weight combined ethyl acrylate. Particularly suitable copolymers are those wherein the percent by weight combined ethyl acrylate is from about 3 percent to about 15 percent. Combined ethyl acrylate content can be determined by standard infrared analysis. Suitable copolymers of ethylene and ethyl acrylate have densities of from about 0.91 to 0.94 gram per cubic cm. at 23° C.

The particular method by which the ethylene-ethyl acrylate copolymers are produced is not critical. Any process can generally be employed wherein the polymerization is carried to a relatively high conversion of monomers to the copolymer. A particularly good method is one in which the copolymer is produced continuously in a tubular reactor by charging the ethylene and the ethyl acrylate into one end of the reactor and withdrawing the copolymer product from the other end. Thus, the copolymers are prepared by copolymerizing, in a tubular reactor, and in the presence of a polymerization catalyst, ethylene with from about 0.1 mole to 1.5 moles and preferably from about 0.2 mole to 0.7 mole of ethyl acrylate per 100 moles of ethylene under pressure ranging from about 20,000 p.s.i. to 40,000 p.s.i. and higher and at temperatures of from about 100° C. to 350° C. Concentration of the polymerization catalyst can be varied from about 0.001 to about 5 mole percent based on the total weight of the monomers.

Application of the ethylene-ethyl acrylate copolymer to a surface of a polyolefin film is made by known techniques such, for example, as by spraying, by dipping, and by brushing. Application can be made, if desired, by roll coating techniques. Application is made preferably from an aqueous emulsion of the copolymer or a solution of the copolymer in a suitable solvent.

A highly satisfactory aqueous emulsion is prepared in the following manner. From about 3 parts to 7 parts by weight of ethylene-ethyl acrylate copolymer is dissolved in from about 20 parts to 30 parts by weight of a solvent for the copolymer. Heat can be applied if desired or required to hasten dissolution of the copolymer in the solvent. To this solution there is then added from about 0.10 part to 0.5 part by weight of an organic emulsifying agent of the type that promotes oil-in-water emulsion. To this solution there is added a solution comprised of by weight, from about 60 parts to 70 parts of water and from about 0.40 part to 0.80 part of a wetting agent. The two solutions are preferably maintained, during the mixing thereof, at elevated temperatures of the order of from about 190° F. to 210° F. Vigorous agitation of the resulting admixture is carried out until a substantially homogeneous emulsion is produced.

Suitable solvents for the copolymer are well known and included xylene, toluene, methyl ethyl ketone, cyclohexane, and mixtures of two or more of such solvents.

The emulsifying agents of the type that promote oil-in-water emulsions are well known in the art. Particularly suitable emulsifying agents for use in carrying out this invention are monoglycerides of fatty acids having 12–24 carbon atoms, said monoglycerides having iodine values in a range of from about 30 to about 120. Monoglycerides of fatty acids having 14–24 carbon atoms are well known compounds. They are glyceryl monoesters of these fatty acids and can be obtained by known procedures. One such procedure is the direct esterification of a fatty acid with glycerol. Generally, it is more practical to use mixtures of fatty acids rather than a pure fatty acid. The product obtained is generally a mixture of monoglycerides and diglycerides containing monoglycerides of an concentration of at least 40 percent by weight and diglycerides (fatty acid diesters of glycerol) at a concentration of at least about 40 percent by weight. Another such procedure is the glycolysis of vegetable and animal oils, that is, the interesterification of glycerol with triglycerides such as those provided by edible lard, refined soybean oil, refined cottonseed oil, refined safflower oil, and the like. Preferably, in the glycerolysis procedure, the resulting interesterification reaction mixture is subjected to thin film, vacuum distillation to distill off a high purity mixture of monoglycerides. This latter procedure for the preparation of distilled, high purity monoglyceride products is described in Patents 2,634,234; 2,634,278; and 2,634,279 to Kuhrt. Such distilled monoglyceride products usually contain monoglyceride in a concentration of at least about 90 percent by weight of the product.

Suitable wetting agents for use in preparing the aqueous emulsion of this invention include diamyl sodium sulfosuccinate (available commercially under the proprietary designation Aerosol AY), dihexyl sodium sulfosuccinate (available commercially under the proprietary designation Aerosol MA), dioctyl sodium sulfosuccinate (available commercially under the proprietary designation Aerosol OT), and di-2-ethylhexyl sodium sulfosuccinate.

The following example is illustrative of the preparation of the aqueous emulsion of ethylene-ethyl acrylate copolymer for use in carrying out this invention. All parts are by weight unless otherwise indicated.

EXAMPLE I

About 4.98 parts of ethylene-ethyl acrylate copolymer containing about 15% by weight combined ethyl acrylate and having a melt index of 18.5 and a density of 0.929 are dissolved in about 24.87 parts of xylene maintained at a temperature of about 200° F. To this solution there is added about 0.25 part of the distilled monoglyceride of safflower oil. About 69.65 parts of boiling water containing about 0.64% part of di-2-ethylhexyl sodium sulfosuccinate are added to the hot (200° F.) copolymer-monoglyceride solution. The resulting mixture is agitated vigorously with a Lightnin Mixer to provide a substantially stable and homogeneous emulsion.

The unitary members of this invention can be prepared in several ways. The aqueous emulsion can be applied to at least one surface of a polyolefin film having the desired final thickness and the volatile components of the emulsion removed therefrom that is, the solvent and the water removed from the applied coating by evaporation. Heat can be applied to hasten removal of the solvent and the water if desired, and additional heat can be applied to fuse the applied ethylene-ethyl acrylate copolymer if desired.

In addition, the aqueous emulsion can be applied to at least one surface of a polyolefin film having a thickness greater than that desired in the final product and the volatile component (water and solvent) of the applied emulsion removed therefrom. The coated sheet can then be compression rolled by passing it, in a single pass, between a pair of heated rolls, rotated at substantially the same speed, whereby the coated sheet is reduced in thickness to the desired degree and there is provided a unitary member comprised of a polyolefin film and a highly adherent coating comprised of ethylene-ethyl acrylate copolymer.

In addition, the aqueous emulsion can be applied directly to the surface of a sheet of polyolefin film while it is being reduced in thickness by compression rolling in accordance with the procedure disclosed and described in application Ser. No. 197,217, filed May 7, 1962, now abandoned. The applied emulsion will serve as a lubricant for the sheet during the compression rolling step in addition to supplying thereto the heat-seal coating. The resulting unitary sheet will be comprised of a polyolefin film of desired thickness having thereon a relatively thin adherent coating comprised of the ethylene-ethyl acrylate copolymer. Substantially all the solvent and water will be removed during the compression rolling step. The emulsion is preferably applied in a manner such that it covers substantially all of the surface of the polyolefin film at the point where pressure is applied. During compression rolling, the temperature of the rolls is maintained at a temperature of about 150° F. to 240° F.

The thickness of the applied coating can be controlled by the concentration of the copolymer in the emulsion or by the amount of emulsion applied to the polyolefin sheeting during compression rolling thereof. The compression rolled coated film can be relaxed, if desired, by passing the coated sheet through an oven maintained at a temperature above the heat distortion temperature of the particular polyolefin employed.

The amount of applied coating, after removal of a volatile component, namely the water and the solvent, is from about 0.20 gram to 4.0 grams per square meter of surface. The preferred amount is from about 0.40 to 0.80 gram per square meter. This results in a substantially discontinuous coating on the surface of the polyolefin film.

The following examples are illustrative of this invention.

EXAMPLE II

The emulsion of Example I is applied to both surfaces of a sheet of high density polyethylene having a thickness that varies between about 6 and 8.8 mils. The applied emulsion is evaporated to dryness to remove therefrom substantially all of the xylene solvent and the water. The thickness of the resulting coating is about 0.1 mil. The coated film is reduced in thickness to about 1 mil by compression rolling it between polished steel rolls maintained at a temperature of about 180° F. and rotated at substantially the same speed. The resulting unitary member can be used to package articles and then heat sealed with a hand sealing iron maintained at a temperature of about 200° F.

EXAMPLE III

A sheet of high density polyethylene of a thickness of about 5 mils is compression rolled between polished steel rolls maintained at a temperature of about 185° F. During the compression rolling of the film the emulsion of Example I is sprayed onto both surfaces of the film in a manner such that both surfaces of the film are substantially covered with the emulsion when pressure is applied by the rolls. The rolls are rotated at substantially the same speed. The resulting film is about 1 mil thick and is coated on both surfaces with a relatively thin highly adherent coating comprised of the ethylene-ethyl acrylate copolymer. A highly satisfactory heat seal is formed between the two pieces of the film by passing in contact therewith a handsealing iron maintained at a temperature of about 200° F.

Instead of applying the ethylene-ethyl acrylate copolymer to a surface of a polyolefin sheet from an emulsion thereof, the ethylene-ethyl acrylate copolymer can be applied from a solution thereof in a suitable solvent such for example as those solvents set forth hereinabove. Suitable solutions are comprised of from about 1 part to 10 parts by weight of the copolymer and from about 99 parts to 90 parts by weight of solvent. It is preferred to incorporate in this solution a monoglyceride as above defined and described. The amount of monoglyceride incorporated in this solution will be of the order of from about 0.5% to 2.0% by weight based on the weight of the solution. The following example is illustrative of this aspect of the invention. All parts are by weight unless otherwise indicated.

EXAMPLE IV

A solution comprised of 15 parts of ethylene-ethyl acrylate copolymer containing about 4% by weight combined ethyl acrylate and about 85 parts of cyclohexane is prepared. To this solution there is added about 1.5% by weight based on the weight of the solution of a distilled monoglyceride of safflower oil and the resulting solution heated to a temperature of about 200° F. The resulting solution is cooled to room temperature during which time it is stirred constantly. The resulting solution is spread onto a surface of a sheet of polypropylene having a thickness of about 4 mils and allowed to dry whereby substantially all the cyclohexane solvent is removed from the applied coating. A highly satisfactory heat seal is formed between two pieces of the film by passing in contact therewith a hand sealing iron maintained at a temperature of about 200° F.

It is to be understood that the above description and specific working examples are illustrative of this invention and not in limitation thereof.

We claim:
1. A unitary member suitable for use as a heat-sealable packaging material comprising a polyolefin substrate and a relatively thin well-bonded coating consisting essentially of an ethylene-ethyl acrylate copolymer containing from about 2 to about 25 weight percent combined ethylacrylate, an oil-in-water emulsifying agent and a wetting agent on at least one surface of the substrate; the ratio of emulsifying agent to copolymer being from about 0.1–0.5 part emulsifying agent to about 3–7 parts copolymer and the ratio of wetting agent to copolymer being from about 0.4 to about 0.8 part of said wetting agent to about 3–7 parts of copolymer.

2. A unitary member suitable for use as a heat-sealable packaging material comprising a polyethylene substrate and a relatively thin well-bonded coating consisting essentially of an ethylene-ethyl acrylate copolymer containing from about 2 to about 25 weight percent combined ethylacrylate, an oil-in-water emulsifying agent and a wetting agent on at least one surface of the substrate; the ratio of emulsifying agent to copolymer being from about 0.1–0.5 part emulsifying agent to about 3–7 parts of copolymer and the ratio of wetting agent to copolymer being from about 0.4 to about 0.8 part of said wetting agent to about 3–7 parts of copolymer.

3. A unitary member suitable for use as a heat-sealable packaging material comprising a polypropylene substrate and a relatively thin well-bonded coating consisting essentially of an ethylene-ethyl acrylate copolymer containing from about 2 to about 25 weight percent combined ethylacrylate, an oil-in-water emulsifying agent and a wetting agent on at least one surface of the substrate; the ratio of emulsifying agent to copolymer being from about 0.1–0.5 part emulsifying agent and the ratio of wetting agent to copolymer being from about 0.4 to about 0.8 part of said wetting agent to about 3–7 parts of copolymer.

4. A unitary member suitable for use as a heat-sealable packaging material comprising a polyethylene substrate and a relatively thin well-bonded coating consisting essentially of an ethylene-ethyl acrylate copolymer, an oil-in-water emulsifying agent and a wetting agent on at least one surface thereof; said copolymer containing at least about 2% by weight combined ethyl acrylate the ratio of emulsifying agent to copolymer being from about 0.1–0.5 part emulsifying agent to about 3–7 parts copolymer and the ratio of wetting agent to copolymer being from about 0.4 to about 0.8 part of said wetting agent to about 3–7 parts of copolymer.

5. A unitary member suitable for use as a heat-sealable packaging material comprising a polyethylene substrate and a relatively thin well-bonded coating consisting essentially of an ethylene-ethyl acrylate copolymer, an oil-in-water emulsifying agent and a wetting agent on at least one surface thereof; said copolymer containing from about 3% to 15% by weight combined ethyl acrylate the ratio of emulsifying agent to copolymer being from about 0.1–0.5 part emulsifying agent to about 3–7 parts copolymer and the ratio of wetting agent to copolymer being from about 0.4 to about 0.8 part of said wetting agent to about 3–7 parts of copolymer.

References Cited
UNITED STATES PATENTS

| | | | |
|---|---|---|---|
| 2,176,053 | 10/1939 | Billing | 260—29.6 |
| 2,368,767 | 2/1945 | Moore | 260—93.3 |
| 2,610,964 | 9/1952 | Ewart et al. | 260—23.7 |
| 2,790,732 | 4/1957 | McGarry et al. | 260—27 |
| 3,055,853 | 9/1962 | Pickell | 260—23 |
| 3,057,810 | 10/1962 | Guillet et al. | 260—23 |
| 3,062,778 | 11/1962 | Van Cleve et al. | 260—45.75 |
| 3,141,870 | 7/1964 | Deex | 260—86.7 |
| 3,189,587 | 6/1965 | Donat | 260—86.7 |
| 3,232,789 | 2/1966 | Pelzek et al. | 117—138.8 |
| 3,088,844 | 5/1963 | Hungerford et al. | 117—138.8 |
| 3,253,059 | 5/1966 | Vollmer | 260—897 |
| 3,277,040 | 10/1966 | Barkis et al. | 117—138.8 |

DONALD E. CZAJA, *Primary Examiner.*

R. A. WHITE, *Assistant Examiner.*